(12) United States Patent
Ju et al.

(10) Patent No.: US 7,280,442 B2
(45) Date of Patent: Oct. 9, 2007

(54) SLIM-TYPE OPTICAL PICK-UP ACTUATOR FOR RECORDING/REPRODUCING DEVICE

(75) Inventors: Chae Min Ju, Osan-si (KR); Young Bok Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 553 days.

(21) Appl. No.: 10/720,386

(22) Filed: Nov. 25, 2003

(65) Prior Publication Data

US 2004/0109395 A1    Jun. 10, 2004

(30) Foreign Application Priority Data

Nov. 26, 2002 (KR) .................. 10-2002-0074086
Mar. 17, 2003 (KR) .................. 10-2003-0016486

(51) Int. Cl.
  *G11B 7/00* (2006.01)
  *G02G 7/02* (2006.01)
  *G11B 7/08* (2006.01)

(52) U.S. Cl. .............. 369/44.16; 369/44.22; 369/44.15; 359/824; 359/813; 720/683

(58) Field of Classification Search .................. None
See application file for complete search history.

(56) References Cited

U.S. PATENT DOCUMENTS

| | | | |
|---|---|---|---|
| 5,103,344 A * | 4/1992 | Yamamoto ............ | 359/813 |
| 5,199,014 A * | 3/1993 | Homburg et al. ...... | 369/44.15 |
| 5,446,712 A * | 8/1995 | Yamada et al. ........ | 369/44.16 |
| 5,479,386 A * | 12/1995 | Takeshita et al. ...... | 369/44.14 |
| 5,719,834 A * | 2/1998 | Futagawa et al. ...... | 369/44.14 |
| 6,278,669 B1 * | 8/2001 | Anzai et al. .......... | 369/44.14 |
| 6,317,277 B1 * | 11/2001 | Izumino et al. ........ | 359/813 |
| 6,341,104 B1 * | 1/2002 | Yamaguchi et al. .... | 369/44.15 |
| 6,344,936 B1 | 2/2002 | Santo et al. .......... | 359/824 |
| 6,608,802 B1 * | 8/2003 | Maeda et al. ......... | 369/44.15 |
| 6,657,944 B2 * | 12/2003 | Mohri et al. .......... | 720/681 |
| 7,038,977 B2 * | 5/2006 | Cheong et al. ........ | 369/44.16 |
| 2006/0221470 A1 * | 10/2006 | Kurokawa ............. | 359/814 |

FOREIGN PATENT DOCUMENTS

| | | |
|---|---|---|
| JP | 02-056736 | 2/1990 |
| JP | 05-073940 | 3/1993 |
| KR | 2001-0075739 A | 8/2001 |

OTHER PUBLICATIONS

Abstract of KR 2003015086A, Feb. 20, 2003.*
Korean Office Action dated Sep. 25, 2006.

* cited by examiner

*Primary Examiner*—Wayne Young
*Assistant Examiner*—Parul Gupta
(74) *Attorney, Agent, or Firm*—Ked & Associates, LLP

(57) ABSTRACT

An optical type pick-up actuator can include a lens holder having an object lens for condensing a light on an optical disc mounted at one side thereof and activated in a predetermined direction, and a plurality of yokes and magnets facing one another. A focusing coil and a tracking coil can be installed between the plurality of magnets, and disposed in a Y-axis direction to activate the lens holder by an electromagnetic force with the magnets in focusing and tracking directions.

23 Claims, 20 Drawing Sheets

SLIM-TYPE OPTICAL PICK-UP ACTUATOR FOR RECORDING/REPRODUCING DEVICE

BACKGROUND OF THE INVENTION

1. Field of the Invention

The present invention relates to an optical disc drive for recording/reproducing device, and more particularly, to an optical pick-up actuator and methods thereof.

2. Background of the Related Art

An apparatus for reproducing a recorded signal stored in an optical disc is called an optical disc drive. Such an optical disc drive has an optical pick-up unit and an object lens driving unit for allowing a light spot to trace a center of a signal track of the optical disc such that an influence of a surface vibration and an eccentricity, etc. of the optical disc depending on a rotation of the optical disc is reduced or minimized on a light beam condensed from the object lens. Such an object lens driving unit is called an optical pick-up actuator. The object lens driving unit allows an activating unit (hereafter "lens holder") having the object lens mounted thereon to move up/down, left/right, etc., to perform a servo function such as focusing and tracking, etc. of the beam condensed on an information recording surface of the optical disc.

Further, in the optical pick-up actuator of the optical disc drive used in a portable personal computer such as a notebook should be manufactured to be as thin and as light as possible for satisfying specifications such as a space limit and a hand convenience. In particular, since an interval between a reflective mirror and the object lens of the optical disc drive is a main element for determining a total height of the optical disc drive or the optical pick-up actuator, a structure for reducing the interval is required. In order to satisfy this requirement specification, a configuration of a front-protrusion-typed object lens is required for the slim-type optical pick-up actuator.

A related art slim-type optical pick-up actuator will be described as follows. As shown in FIGS. 1 and 2, the related art slim-type optical pick-up actuator 100 includes an object lens 101 mounted in a protrusion type on one side front surface of a lens holder 102, a focusing coil 103 wound along a circumference surface of a bobbin 110 having a first housing groove 102a formed at a center of the lens holder 102, and a tracking coil 104 wound at left/right portions of one side of the focusing coil 103.

Additionally, a pick-up base 106 has U-shaped yokes 106a protruded therefrom, and magnets 105 are attached to the one lateral surfaces (facing surfaces) of the protruded yokes 106a. Such magnets 105 and yokes 106a are respectively protruded toward the first housing groove 102a and a second housing groove 102b such that the magnets 105 face each other.

In the pick-up base 106, a support 106b spaced a predetermined distance away from the yoke 106a, a frame 109, and a circuit substrate 108 attached to a rear surface of the frame are combined and fixed using a screw 120 and screw holes 108a and 106c. Additionally, the lens holder 102 is supported by a pair of wire suspensions 107 connected between the frame 109 and a substrate 111 fixed to a central portion of both lateral surfaces of the lens holder.

The focusing coil 103 is installed around a circumference surface of the second housing groove 102b, and the tracking coil 104 is installed at both front sides of the focusing coil 103. A single groove formed in an internal section of the lens holder 102 is divided into the first and second housing grooves 102a and 102b by the bobbin 110 around which the focusing coil 103 and the tracking coil 104 are wound.

One side portion of each of the tracking coil 104 is positioned between the magnets 105. Further, each tracking coil 104 faces left/right sides of the magnets 105 facing each other.

In this structure, if a current is applied to the focusing coil 103 and the tracking coil 104, the focusing and tracking coils 103 and 104 each are subjected to the force of the electromagnetic interaction of the focusing and tracking coils 103 and 104 and the magnets 105 to move together with the lens holder 102. The focusing coil 103 and the tracking coil 104 are subjected to the force of the interaction with the magnet in a direction following the Fleming's left-hand rule.

At this time, if the interaction of the focusing and tracking coils 103 and 104 and the magnet 105 allows an electromagnetic force to be applied to the focusing and tracking coils 103 and 104, the bobbin 110 moves, together with the lens holder 102, in a focusing direction (Z) and a tracking direction (Y). The object lens 101 protruded at one side of the lens holder 102 is moved to control the position where the light spot is focused on the optical disc (not shown).

As shown in FIGS. 2 and 3, the mass center position (G) of the lens holder 102 using the above-described magnetic circuit structure is positioned between each tracking coil 104 and focusing coil 103. At this time, an operation center position (C1) of the first focusing coil 103a positioned between two magnets 105 is formed at an intersection point of a center of left/right sides of a first focusing coil 103a and a center of a coil thickness, and an operation center position (C2) of the tracking coil 104 is formed at an intersection point of a center of left/right-side tracking coils and a center of a coil thickness. Accordingly, the operation center positions (C1, C2) of each of the focusing and tracking coils 103a and 104 are positioned at different points. This is caused by a structure having the focusing coil 103 passing between two magnets 105 and having the tracking coil 104 at one external (e.g., both left/right) side of the focusing coil 103.

Additionally, the mass center position (G) of the lens holder 102 including the bobbin 110 having the coils 103 and 104 installed is designed to be positioned between the operation center positions (C1, C2) of the focusing and tracking coils 103a and 104. Generally, a consistency of the operation center positions (C1, C2) of the coils 103a and 104 with the mass center position (G) at one position would allow the actuator to perform in its best or optimal operation state. When the mass center position (G) is in a non-consistent state with both the operation center positions (C1, C2) of the coils 103a and 104, but is allowed to be consistent with only one operation center position, an operation characteristic of the coil is deteriorated.

Accordingly the mass center position (G) is designed to be positioned between the operation center positions (C1, C2) of the coils 103a and 104. However, even in this case, since the mass center position (e.g., a movement center position (G)) of the lens holder 102 is not consistent, there is a drawback in that the lens holder 102 moves in a slant (e.g., not exactly in the Y and Z directions), at the time of a focusing or tracking operation. Further, the operation center position of the second focusing coil 103b (C3) is positioned at an opposite side of the focusing coil 103. Since a leakage flux of these portions (C3, 103b) is positioned at a rear surface of the magnet 105, it acts with a force in an opposite direction to the focusing operation.

FIGS. 4a and 4b are diagrams showing distribution views of a magnetic flux density and a vector of the coil in the optical pick-up actuator of FIG. 1. As shown in FIG. 4a, if the current is applied to the focusing coil 103, the flux density of the focusing coil 103 has an unbalanced distribution. That is, the first focusing coil 103a portion between the magnets 105 has the magnetic flux concentrated by the interaction of the magnet 105, but since the second focusing coil 103b portion at the rear surface of the yoke is blocked by the yoke 106a, it is not affected by the magnet 105.

FIG. 4b is a view illustrating a flux distribution and a vector distribution of a related art tracking coil. Since the tracking coil 104 is disposed at the left/right sides of the magnet 105, the magnetic flux is concentrated in a central direction of the magnet 105.

As shown in FIG. 5, the first focusing coil 103a at an inner side of the yoke 106a is subjected to the electromagnetic force caused by the interaction with the magnet 105, while the second focusing coil 103b at an outer side of the yoke 106a is blocked by the yoke 106a and is less affected or not affected by the magnet 105. Further, as shown in FIG. 5, the magnetic force line by the magnet 105 is less deviated from a center of the magnet 105 while it is widely spread at an edge of the magnet 105. Meanwhile, the magnetic force line is deviated from the yoke 106a to leak outside. The second focusing coil 103b positioned outside of the yoke 106a is affected by this leakage flux.

As shown in FIG. 5, an arrow coming from the focusing coil 103 illustrates a magnitude and a direction of the force applied to the focusing coil 103 according to a distribution of the magnetic force line by the Fleming's left-hand rule. As described above, even the outside second focusing coil 103b is subjected to the force by the affection of the leakage flux, and with respect to the total force from the focusing coil 103, this causes an unbalanced distribution of the force. That is, as shown in FIG. 6, a force (Fu) applied to the first focusing coil 103a positioned inside of the yoke 106a and a force (Fd) applied to the second focusing coil 103b positioned outside of the yoke 106a are unbalanced. Accordingly, a pitching mode (shown in FIG. 10a) occurs in which the bobbin 110 and the lens holder 102 yaw front and rear. That is, the bobbin 110 and the lens holder 102 are yawed in a direction of an arrow (P) of FIG. 6.

Further, the outside second focusing coil 103b is not used for a focusing operation, and a sensitivity of the optical pick-up actuator is reduced by a mass increase and a resistance increase of the wound coil. Accordingly, it impedes a high speed following capacity depending on a high-multiple speed of the disc.

On the other hand, at the time of movement of the left/right tracking coils 104 depending on a track direction (A), since the movement center position and the mass center position (G) are not consistent with each other, a rolling mode (shown in FIG. 10b) occurs. As shown in FIG. 7, when the bobbin 110 is in a stop state, a total mass center position (G) of the optical pick-up actuator 100 and the movement center position (H) of the bobbin 110 are consistent with each other. Arrows of the drawings illustrates the magnitude and the direction of the force applied to the tracking coil 104 by the magnet 105. The magnitude of the force applied to the tracking coil 104 depends on the magnitude of the magnetic flux and the current flowing through the tracking coil 104, and depends on only the magnitude of the magnetic flux in case the current is constant. Thus, the magnetic flux is the largest at the central portion of the magnet 105, and gradually becomes smaller at an outside edge thereof. Again, as shown in FIG. 7, when the tracking coil 104 is at a neutral position, since the magnetic flux is symmetrically distributed centering on the tracking coil 104, the mass center position (G) and the movement center position (H) of the tracking coil are allowed to be consistent with each other.

However, as shown in FIG. 8, if the bobbin 110 is focused upward by the focusing coil 103, the force applied to the tracking coil 104 by the magnet 105 is deflected downward of the tracking coil 104. Accordingly, since the downward tracking force of the bobbin 110 is larger than the upward tracking force thereof, the rotation moment is generated in an arrowed direction (R1). To the contrary, as shown in FIG. 9, if the bobbin is downward-focused by the focusing coil 103, the force applied to the tracking coil 104 by the magnet 105 is deflected upward of the tracking coil 104. Accordingly, since the tracking force upward of the bobbin 110 is larger than the tracking force downward thereof, the rotation moment is generated in an arrowed direction (R2). As a result, according to the focusing operation of the bobbin 110, the movement center position (H) of the tracking coil 104 is not allowed to be consistent with the mass center position (G), which results in the rolling mode (shown in FIG. 10b) rolling in the arrowed directions (R1, R2).

In the related art lens holder 102, a frequency characteristic of the optical pick-up actuator is determined by a rigidity of the wire suspension 107, which is installed at both sides. But, since the lens holder itself is an apparatus structure, it has a vibration frequency, and when the optical pick-up actuator is vibration-added at the vibration frequency, it is resonant in a proper vibration mode of the lens holder 102.

In related art optical pick-up actuator having the lens holder, the lens holder structure is vibrated to have a twisted or bent shape in a mode in which a total of the lens holder is transformed. In the related art lens holder, the focusing operation or the tracking operation should be completed before an initial transformation frequency of 17.2 KHz, and therefore, at a high-multiple speed of reproduction, a focusing or tracking control becomes difficult. Since this type of vibration mode in the lens holder causes the object lens to be vibrated at the same time, the beam is directly influenced such that it is difficult to control the actuator, which should follow the disc.

In addition, the proper vibration mode of the lens holder 102 is a characteristic, which is determined by a shape of the lens holder 102. The object lens 101 is vibrated together by the vibration mode of the lens holder itself. Accordingly, since the beam is distorted, a control characteristic of following the disc is badly affected.

As described above in the related art structure, a rotation vibration mode such as the pitching mode and the rolling mode in the actuator can affect a phase and a variation of a basic frequency characteristic at the time of the focusing and tracking operations, and accordingly, a degradation of the optical signal is caused. If the magnitude of the magnet 105 is increased to increase the flux density for improving an alternate current sensitivity, since the leakage flux is also increased together thereby resulting in a sub-resonance. Thus, there has been a limit in increasing the flux density. Furthermore, in the high-multiple speed and high density of optical recording and reproducing device, a pitching mode and rolling mode phenomenon can more seriously occur, and a degradation of the optical signal is caused.

In addition, the related art optical pick-up actuator has a drawback because when a high-dimensional resonant frequency is included in a high-pass frequency range, as the bobbin is transformed, the object lens is transformed or a position of the object lens is also changed in the bobbin to thereby cause the disc not to be exactly focused. Accordingly, the track signal of the disc is not exactly read out to thereby cause reproduction to be degraded or impossible.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an optical pick-up actuator that substantially obviates one or more problems due to limitations and disadvantages of the related art.

Another object of the present invention is to provide an optical pick-up actuator configured to have a consistent mass center position and a force center position of a lens holder.

Another object of the present invention is to provide a slim-type optical pick-up actuator in which coils operating between two magnets together with a lens holder are arranged in a Y-axis direction such that a mass center position and a force center position of the lens holder are aligned.

Another object of the present invention is to provide a slim-type optical pick-up actuator in which a focusing coil and a tracking coil are all disposed in an operation area range of a lens holder and between magnets such that surfaces of wound coils respectively face the magnets.

Another object of the present invention is to provide a slim-type optical pick-up actuator in which, for a high sensitivity and a stability of a driving characteristic, a force center position of a focus coil and a force center position of a tracking coil can be consistent with each other at one position in an X-axis direction.

Another object of the present invention is to provide a slim-type optical pick-up actuator in which coils wound between two magnets in directions different from each other are disposed to relatively widen a spaced distance between the two magnets such that a yoke vibration by a counter electromotive force can be reduced or eliminated and a servo stability can be improved.

Another object of the present invention is to provide a slim-type optical pick-up actuator having a coil supporter in a lens holder configured to allow the coil to be seated and fixed thereto such that a weight of the lens holder can be reduced to assure a driving reliability.

To achieve at least these objects and other advantages in a whole or in part and in accordance with the purpose of the invention, as embodied and broadly described herein, there is provided a slim-type optical pick-up actuator that includes a lens holder having an object lens for condensing a light on an optical disc, mounted at one side thereof, wherein the lens holder is configured to move in focusing and tracking directions, a base having a plurality of first support members, each having a magnet attached thereto, wherein the magnets face each other and a driving member having a focusing coil and at least one tracking coil directly attached to the focusing coil in series in the tracking direction, wherein the lens holder comprises a second support member extending therefrom configured to support the driving member between the magnets, and wherein the driving member activates the lens holder by an electromagnetic force with the magnets in focusing and tracking directions.

To further achieve at least these objects and other advantages in a whole or in part and in accordance with the purpose of the invention, as embodied and broadly described herein, there is provided an optical pick-up actuator that includes a base that includes a magnetic support unit having a plurality of magnets facing each other, a lens holder configured to be driven in tracking and focusing directions that includes an object lens mounted at a first side portion thereof and a magnetic driving unit mounted at a second side portion thereof positioned between the magnets, wherein a mass center position of the lens holder is substantially coincident with a force center position of the magnetic driving unit.

To further achieve at least these objects and other advantages in a whole or in part and in accordance with the purpose of the invention, as embodied and broadly described herein, there is provided a slim-type optical pick-up actuator that includes single magnets fixed to face one another having a magnetic field area therebetween, a lens holder having an object lens mounted at one side thereof for activation, and having tracking and focusing coils symmetrically installed directly connected to each other in the magnetic field area of the magnets, a frame for supporting the lens holder and a plurality of wire suspensions for flexibly attaching the frame to the lens holder.

To further achieve at least these objects and other advantages in a whole or in part and in accordance with the purpose of the invention, as embodied and broadly described herein, there is provided a method of forming a optical pick-up actuator that includes providing a lens holder having an actuation area therein, winding focusing and tracking coils, directly attaching at least one tracking coil to at least one focusing coil to form a driving unit extending along a tracking direction of the lens holder, coupling an object lens to a first side of the lens holder, coupling the driving unit to a second side of the lens holder and flexibly attaching the lens holder to a frame so that the driving unit is supported completely in the actuation area.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 11:
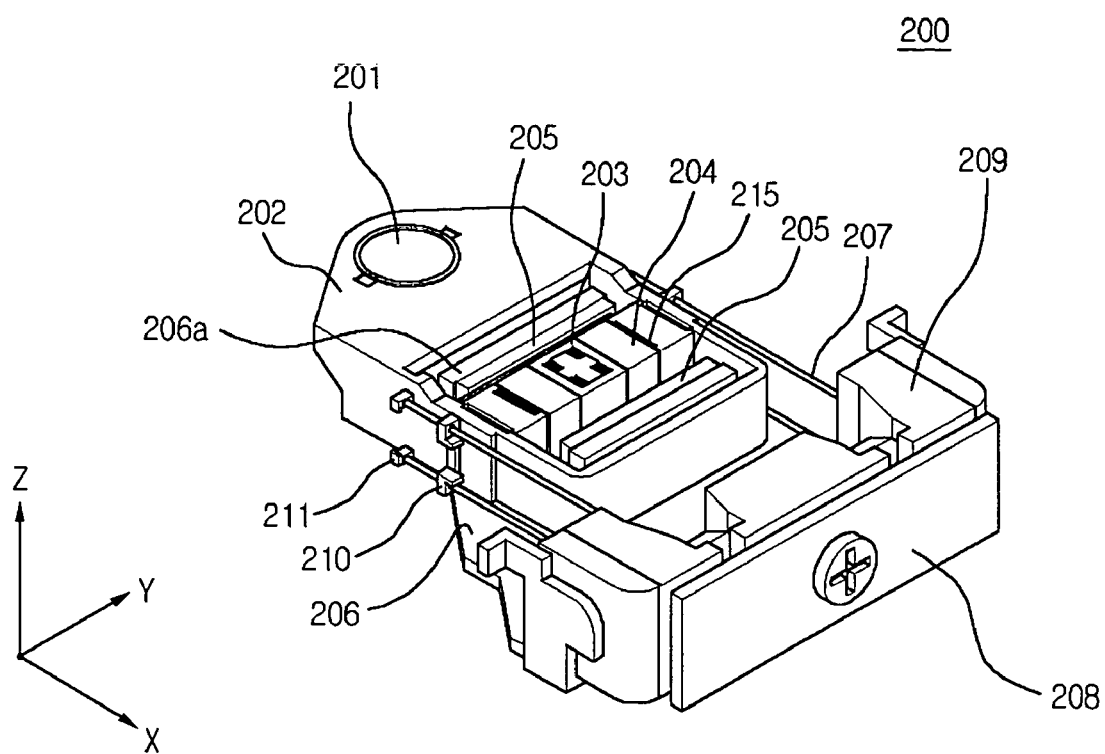
FIG. 11 is a diagram illustrating perspective view of a slim-type optical pick-up actuator according to a preferred embodiment of the present invention.
Figure 12:
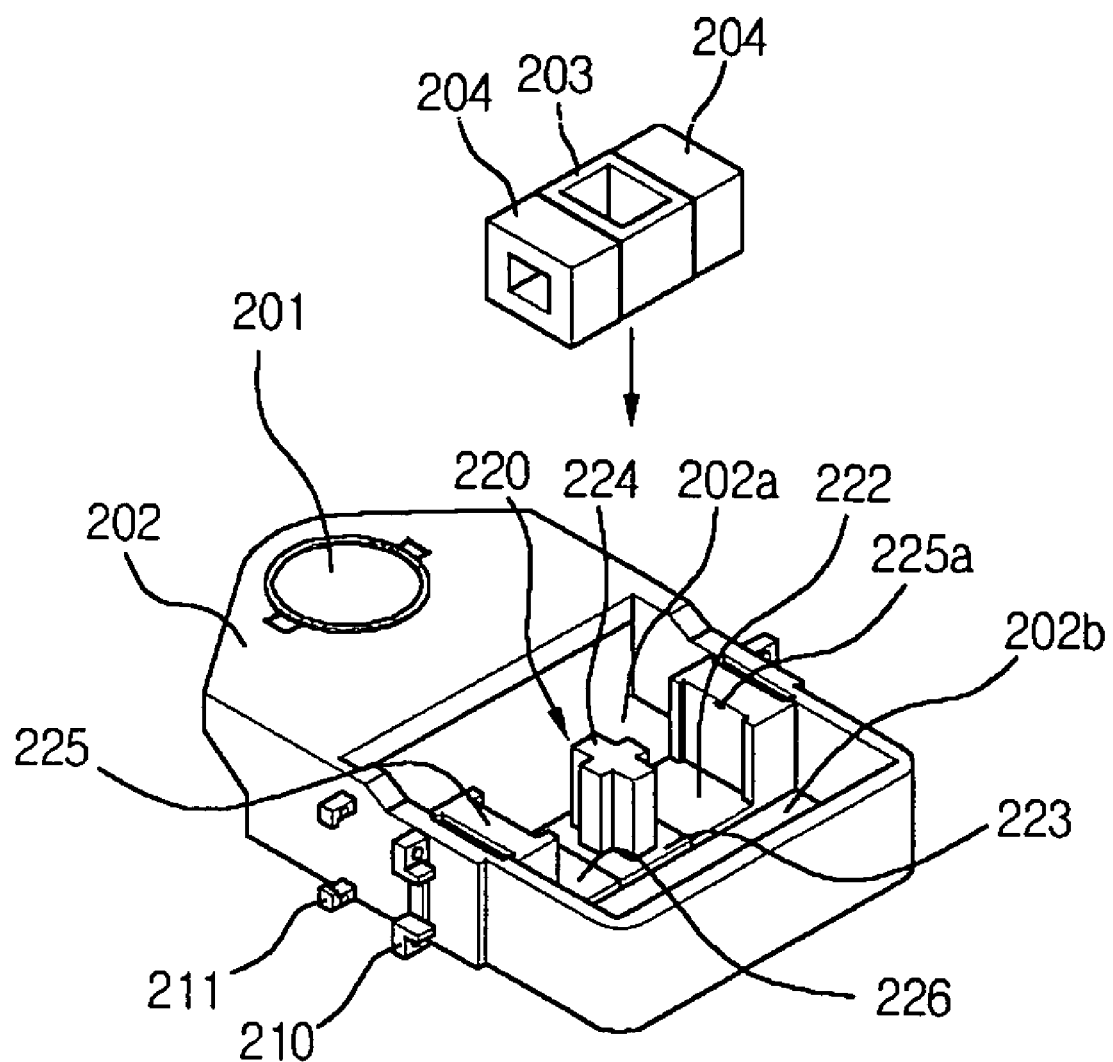
FIG. 12 is a diagram illustrating disassembled perspective view of a lens holder of FIG. 11.

FIG. 11 is a diagram illustrating an optical pick-up unit actuator according to an embodiment of the present invention. As shown in FIGS. 11 to 13, the optical pick-up actuator 200 can include a lens holder 202 having an object lens 201 protruded from and mounted on one side upper portion thereof, and having first and second housing grooves 202a and 202b and a coil supporter 220 in an internal section. A focusing coil 203 can be seated on the coil supporter and horizontally wound to have a rectangular shape substantially in a center of the lens holder 202, and a tracking coil 204 can be seated on the coil supporter and vertically wound to have the rectangular shape in front and rear lateral surfaces of the focusing coil 203. However, the present invention is not intended to be so limited as the shapes of the coils can be varied. A yoke 206a and a magnet 205 attached thereto can be protruded toward the first and second housing grooves 202a and 202b of the lens holder 202 from a pick-up base 206. Wire suspensions 207 can respectively support the lens holder 202 at their left/right sides. A main substrate 208 electrically can be coupled to the coils 203 and 204 and a frame 209 fixed to a rear of a pick-up base 206 can support the wire suspensions 207.

The single magnet 205 preferably faces the coils 203 and 204 by a single polarity (N:S), and has its facing area wider than a combined area of the focusing coil 203 and the tracking coil 204.

Figure 13A:
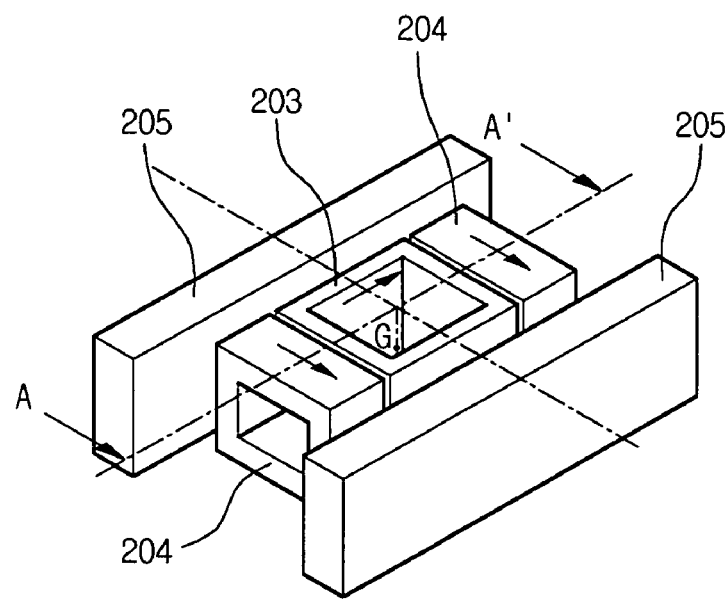
FIGS. 13a and 13b are diagrams illustrating construction of a coil and a magnet of FIG. 11.
Figure 13B:
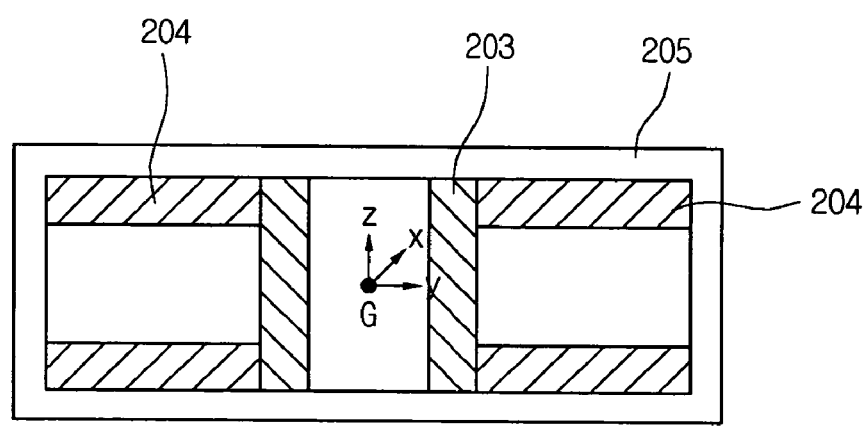

Additionally, the optical pick-up actuator 200 can be characterized that an internal center position of the focusing coil 203 can be a focusing force center position, a symmetrical tracking force center position and a mass center position of the lens holder. Further, as shown in FIGS. 13a-b, a distance between two magnets can be 3.6 mm.

The lens holder 202 can have a construction in which the coil supporter 220 (e.g., shown in of FIG. 12) for supporting the coils 203 and 204 is integrally formed between the first and second housing grooves 202a and 202b attached at sides internal section of the lens holder.

As shown in FIGS. 11 to 13, in the optical pick-up actuator 200, on one side upper portion of the lens holder 202 is mounted the object lens 201, and between both sides of the lens holder 202 and the frame 209 is connected the pair of wire suspensions 207 to support the lens holder 202 with a predetermined degree of freedom. The wire suspensions 207 can be electrically coupled for current flow to the main substrate 208 attached to the rear surface of the frame 209 and a substrate (e.g., contact point) 211 located at left/right lateral surfaces of the lens holder 202.

As shown in FIG. 12, the lens holder 202 can have, the first and second housing grooves 202a and 202b formed in the other side internal section and have the coil supporter 220 integrally formed between the first and second housing grooves 202a and 202b. The coil supporter 220 can be on an internal bottom surface of the lens holder 202 in the Y-axis direction and have a cross-shaped boss 224 formed in a center thereof and a tracking coil seat groove 222 positioned at or formed in left/right sides thereof. Preferably, onto the cross-shaped boss 224 is fitted and combined the focusing coil 203, and on the coil seat groove 222 is seated the tracking coil 204. Since the focusing coil 203 can be seated laying-down and the tracking coil 204 can be seated standing upright, the focusing coil 203 and the left/right tracking coils 204 can be compactly combined in the Y-axis direction.

The focusing coil 203 and the tracking coil 204 are preferably compactly combined with each other by a bonding process, and then are seated on or fixed to the coil supporter 220. Thus, the bobbin for fixing the focusing and tracking coils can be eliminated to reduce the weight of the lens holder relative to the related art. Further, epoxy 215 can be filled between a circumference and an external of the cross-shaped boss 224 and the groove 225a of the boss 225 inwardly formed in the lens holder 202, to fix the coils 203 and 204, respectively.

In addition, since in the first and second housing grooves 202a and 202b of the lens holder 202 can be positioned an U-shaped yoke 206a formed on the pick-up base 206 and the magnet 205 can be attached to an inner lateral surface of the yoke, both lateral surfaces of the horizontally wound focusing coil 203 face the magnet 205, and both lateral surfaces of the tracking coil 204 vertically wound in a rectangular type face the left/right sides of the magnet 205. As an embodiment, the magnet has the single polarity.

A base of the coil supporter 220 can include layers different from one another such that a base 223 of the cross-shaped boss 224 of the coil supporter 220 has a height different from that of a bottom surface 226 of the coil seat groove 222 in order to adjust a height of the focusing coil 203 and a height of the tracking coil 204. The lens holder 202 can be formed of a material (e.g., plastic) integrally with the cross-shaped boss 222 of the coil supporter 224, the base 223, and the bottom surface of the coil seat groove 222, or can be also manufactured in a separate combination structure.

As shown in FIGS. 13a and 13b, embodiments of the present invention can use a structure of disposing the coils 203 and 204 between the magnets 205. A center of the magnet 205 can face the focusing coil 203, and at both sides of the magnet 205 are respectively disposed the left/right tracking coils 204. That is, each of the coils is disposed along the Y-axis direction shown in FIG. 11. Further, since the magnet 205 preferably has a wider area than a facing area of the focusing coil 203 and the tracking coil 204, the magnetic flux distribution can be balancingly taken depending on the focusing and tracking operations of the focusing and tracking coils 203 and 204.

Since the magnet 205 is disposed front/rear of the focusing coil 203 centering thereon, and the tracking coil 204 is disposed left/right thereof, the center position (G) of the focusing coil 203 can be the mass center position and is also the force center position depending on the focusing or tracking operations. In other words, the center position (G) between the two magnets 205 preferably becomes the mass center position and the force center position depending on the activation. That is, the operation center position of the focusing coil 203 and a moment center position of two tracking coils 204 installed along the Y-axis direction centering on the focusing coil 203 are allowed to be consistent with each other in the one position (G). If the mass center position of the lens holder 202 is configured to be consistent with the one position (G), the operation center position of the coils can be allowed to be consistent with the mass center position of the lens holder 202. Accordingly, since the center position (G) of the coils 203 and 204 can preferably fly become the mass center position and the force center position depending on the activation or the center position of the focusing coil 203 can become the force center position of the tracking coil 204, the center between the magnets 205 can become the mass center position and the force center position depending on the activation.

Accordingly, the mass center position and the operation center position depending on the focusing driving or/and the tracking driving of the lens holder 202 preferably have a structure of being consistent with each other at one center position (G) along the X-axis direction shown in FIG. 11. Further, since the magnets 203 face both sides of the focusing coil 203, the leakage flux can be reduced or prevented and a moving object (e.g., lens holder) can be moved more accurately or exactly.

If the focusing coil 203 or/and the tracking coil 204 disposed between the two magnets 205 has current applied thereto, the coils are subjected to the force of the electromagnetic interaction of the magnets 205 and the focusing coil 203 and the tracking coil 204, and the lens holder 202 can be cooperatively moved. A force-subjected direction of the focusing coil 203 and the tracking coil 204 follows the Fleming's left-hand rule.

When the interaction of the focusing and tracking coils 203 and 204 and the magnet 205 cause the electromagnetic force to be applied to the coil, the coil structure (e.g., coil body) and the moving object (e.g., lens holder) are allowed to move in a focusing direction (Z-axis) or a tracking direction (Y-axis). Accordingly, the lens holder 202 moves while the object lens 201 moves to adjust a light-spot-focused position on the disc (not shown).

Figure 14:
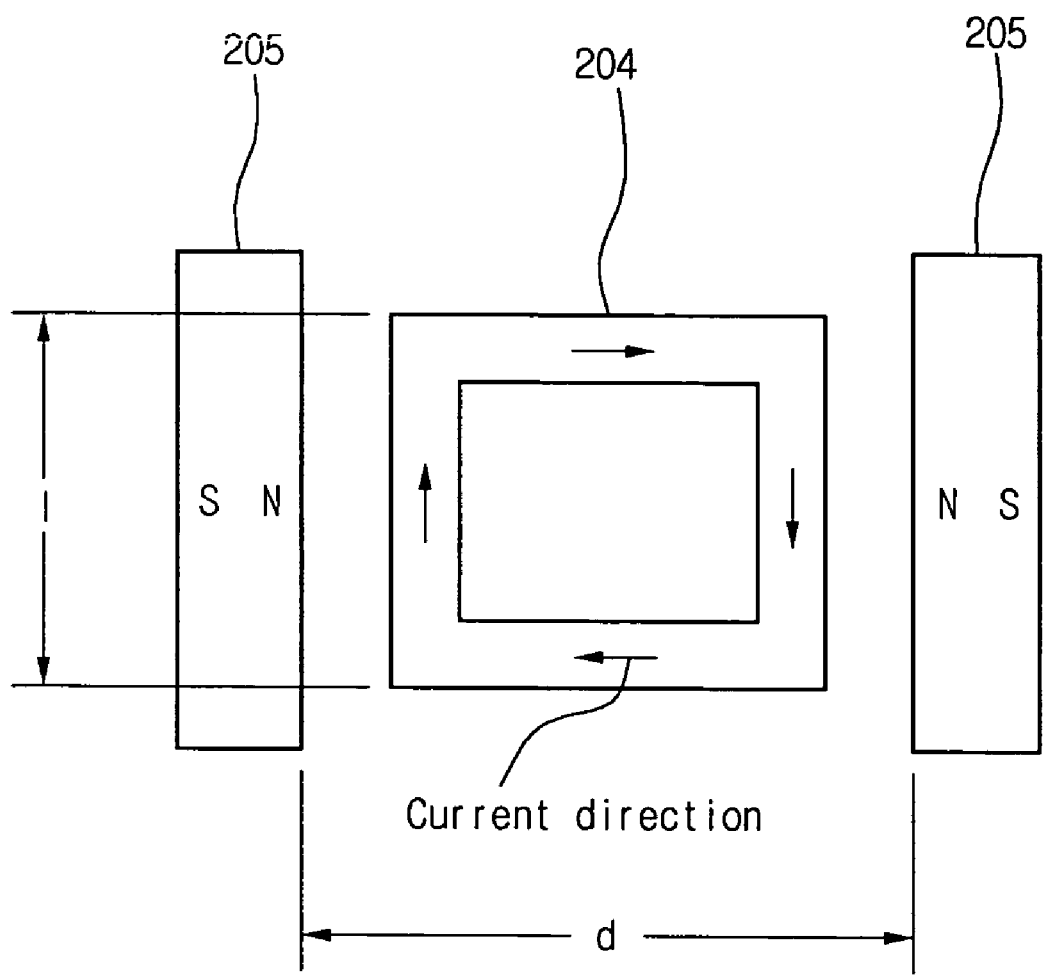
FIG. 14 is a diagram illustrating a distance between magnets and an interlink length according to an embodiment of the present invention.

FIG. 14 is a side view diagram illustrating the tracking coil and the magnets according to an embodiment of the present invention. As shown in FIG. 14, an interlink length (l) by the tracking coil 204 and the magnet 205 can be additionally provided relative to the related art tracking coil, to thereby improve a servo stability. Further, a distance (d) between the magnets 205 can be wider than that of the related art such that the back electromagnetic force (e.g., Back EMF) generated from the interaction between the magnets 205 can be reduced or eliminated to improve the performance.

Operations for an optical pick-up actuator according to the present invention will now be described. Such operations can be applied to and will be described using the actuator 200. However the embodiments are not intended to be so limited.

Figure 1:
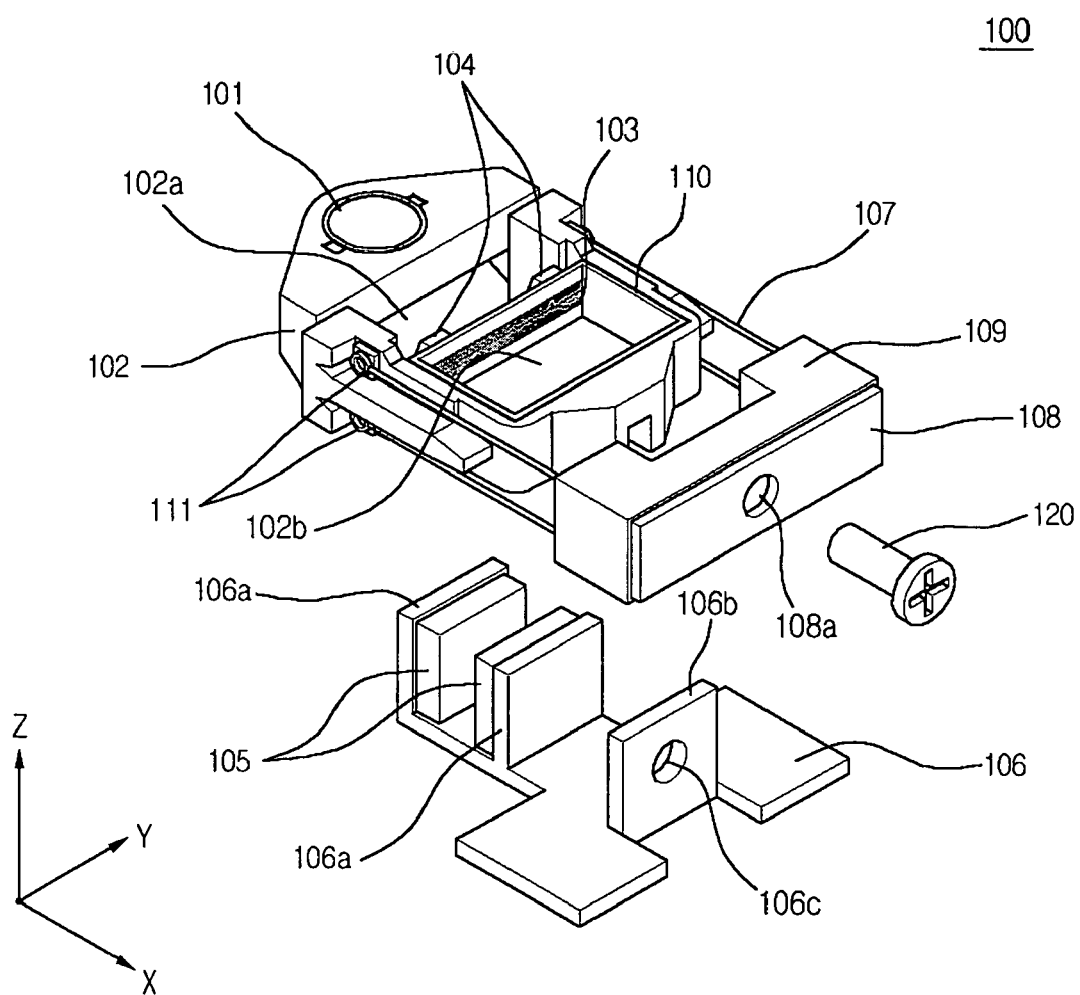
FIG. 1 is a perspective view diagram illustrating a structure of a related art slim-type optical pick-up actuator.
Figure 2:
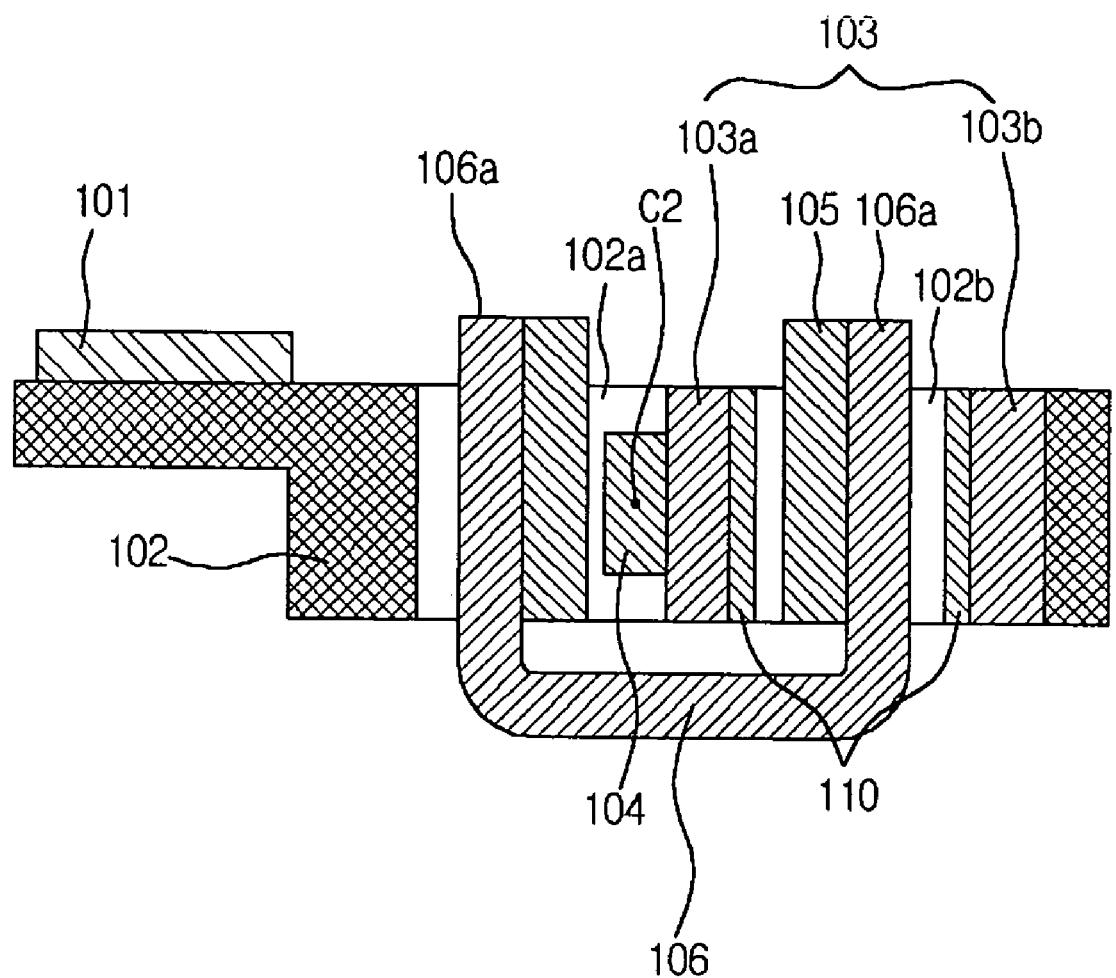
FIG. 2 is a diagram showing partial side sectional view of FIG. 1.
Figure 3:
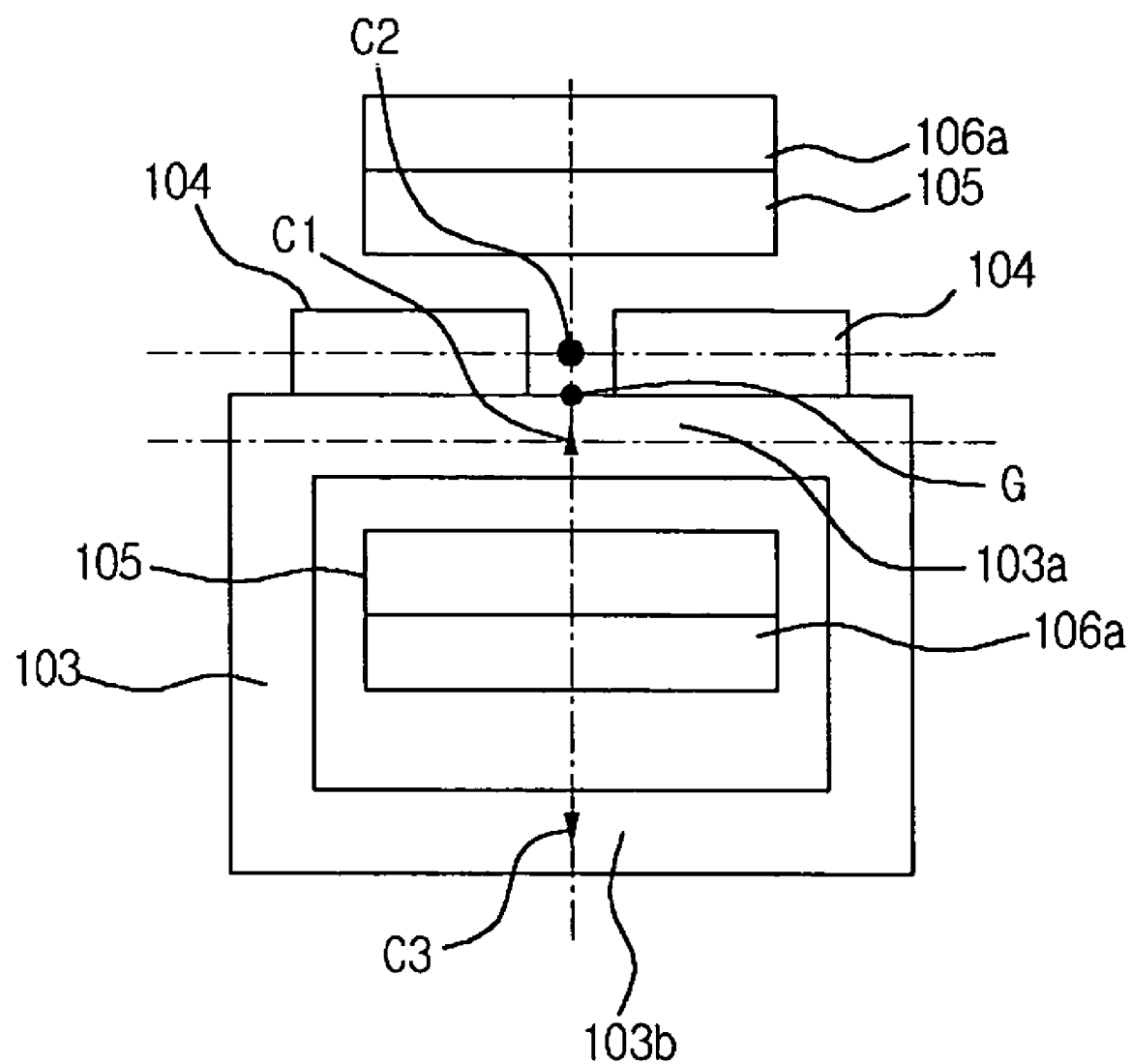
FIG. 3 is a diagram showing plane view illustrating a coil and a magnet for representing a mass center position and a force center position in a magnetic circuit of a related art optical pick-up actuator.
Figure 4A:
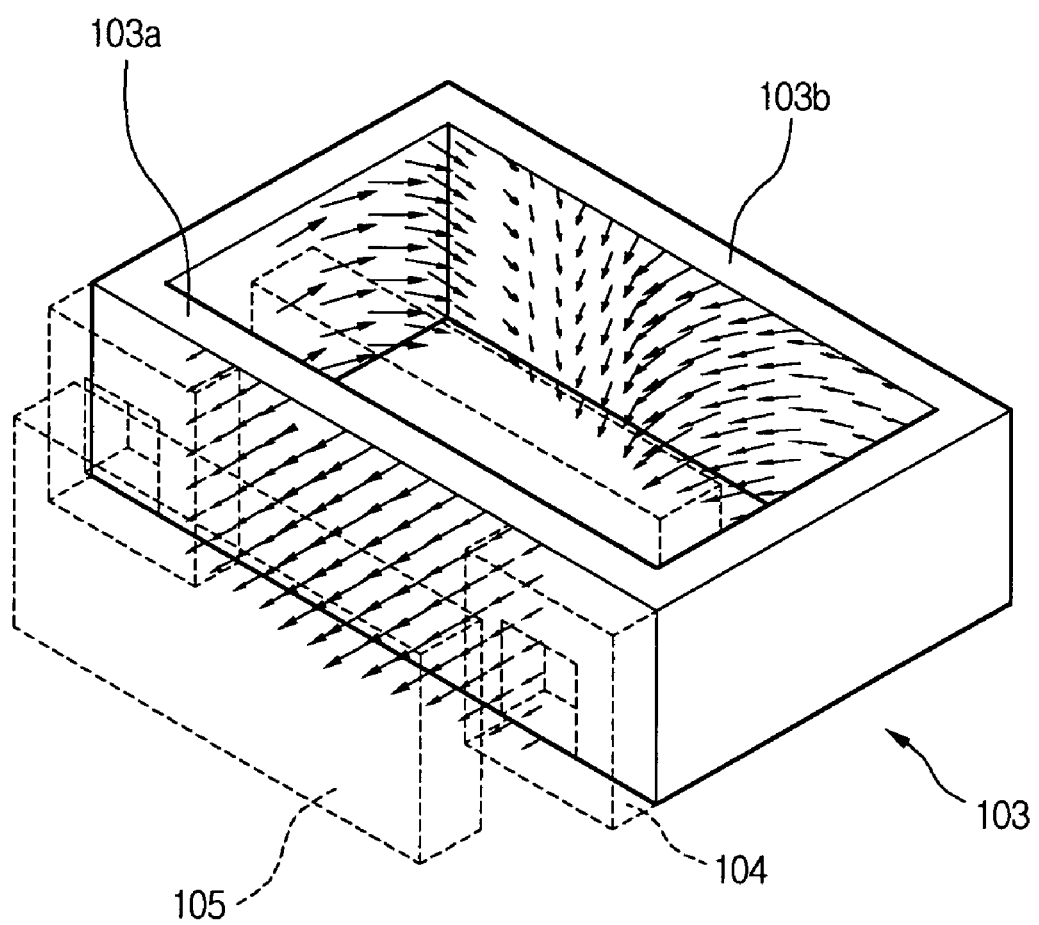
FIGS. 4a-4b are diagrams illustrating a distribution of a magnetic flux and a vector of focusing and tracking coils.
Figure 4B:
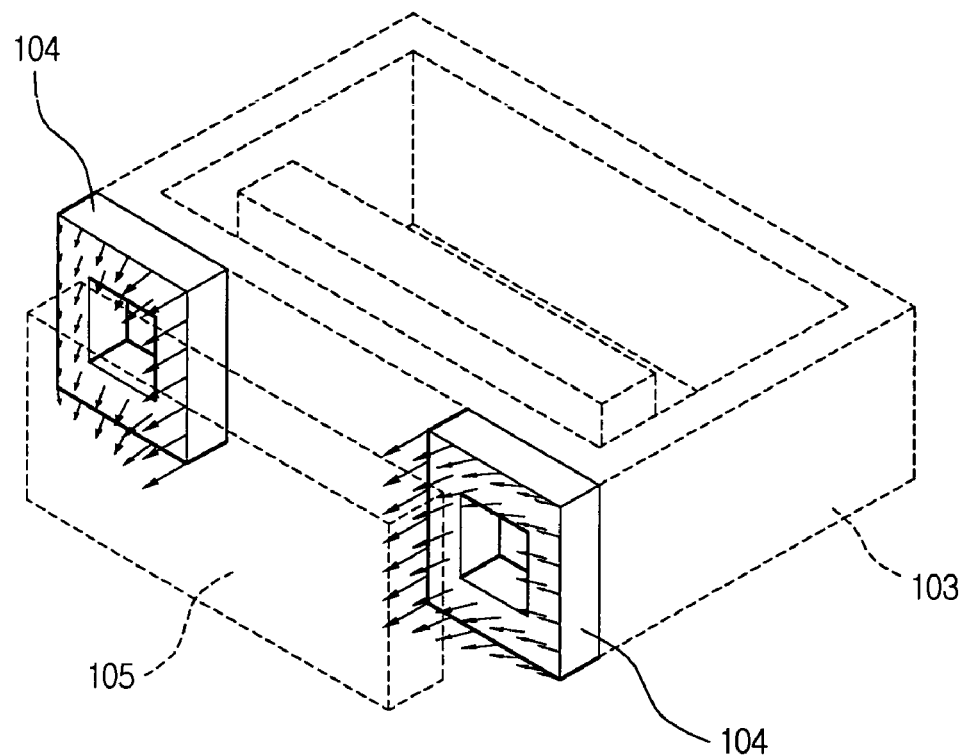
Figure 5:
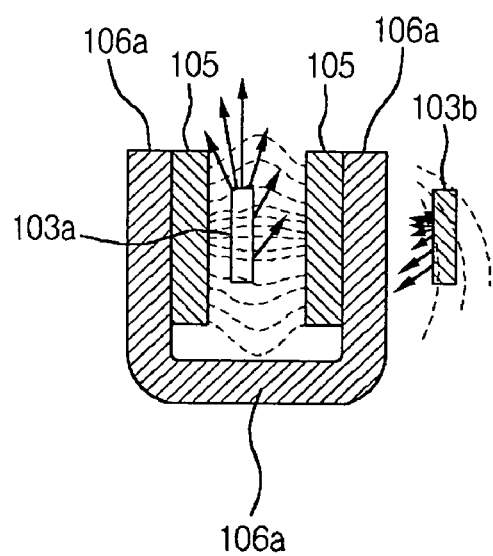
FIGS. 5 and 6 are diagrams illustrating a magnetic force line and a rotation moment in a related art optical pick-up actuator.
Figure 6:
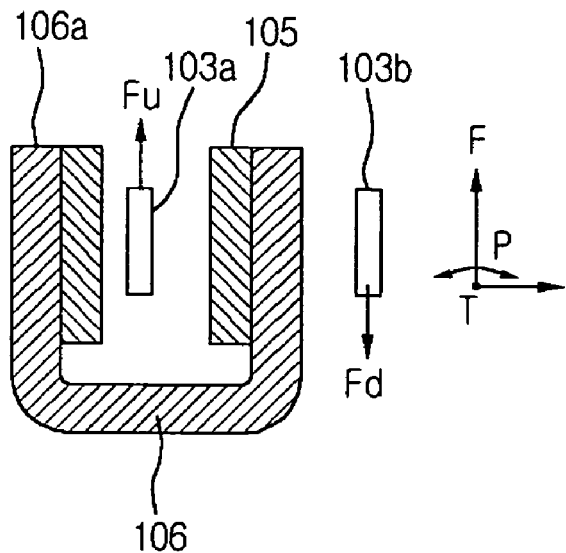
Figure 7:
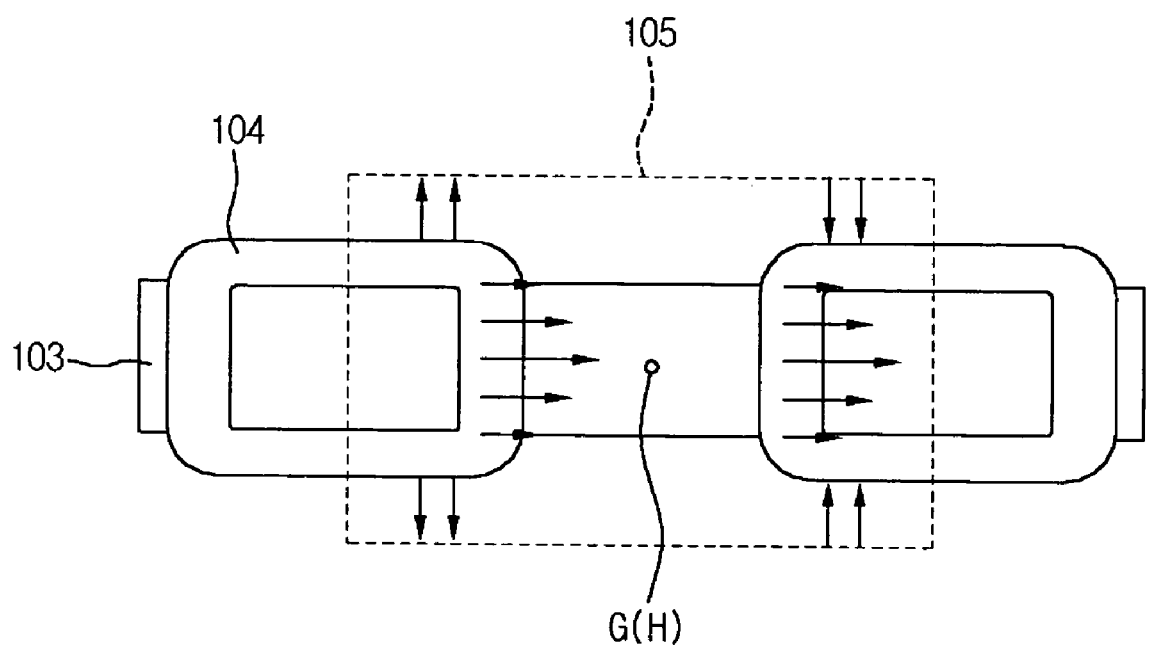
FIGS. 7 to 9 are diagrams illustrating a rolling mode by a tracking coil in a related art optical pick-up actuator.
Figure 8:
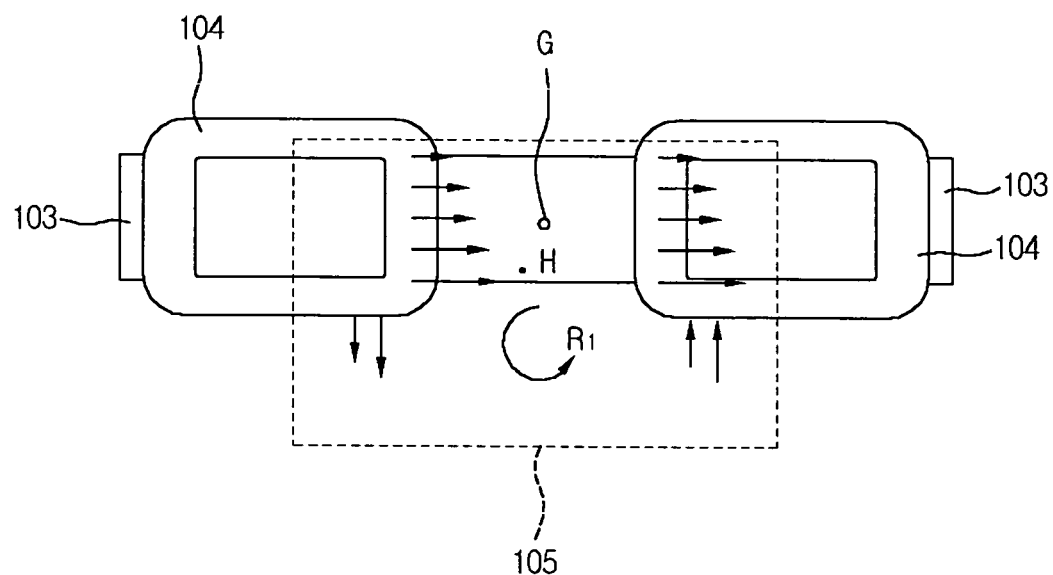
Figure 9:
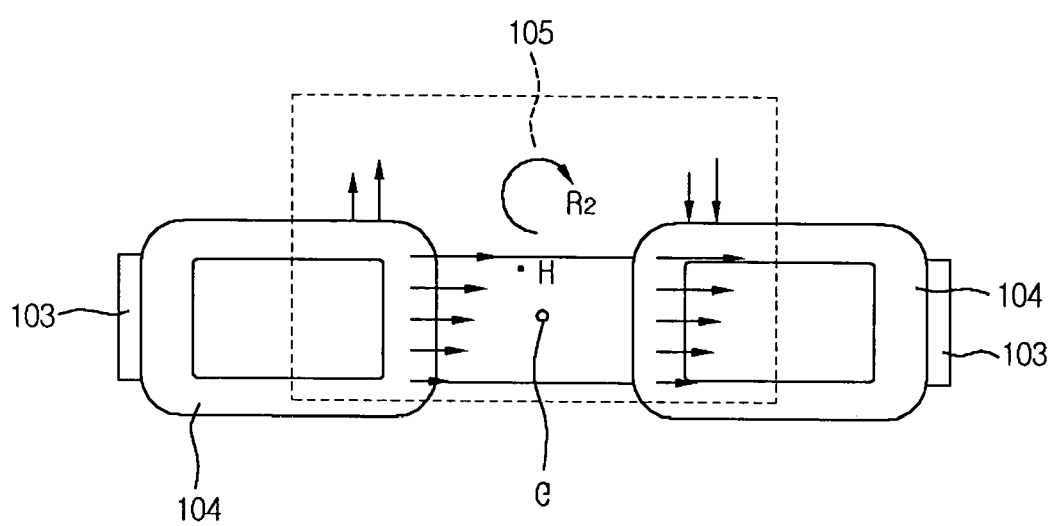
Figure 10A:
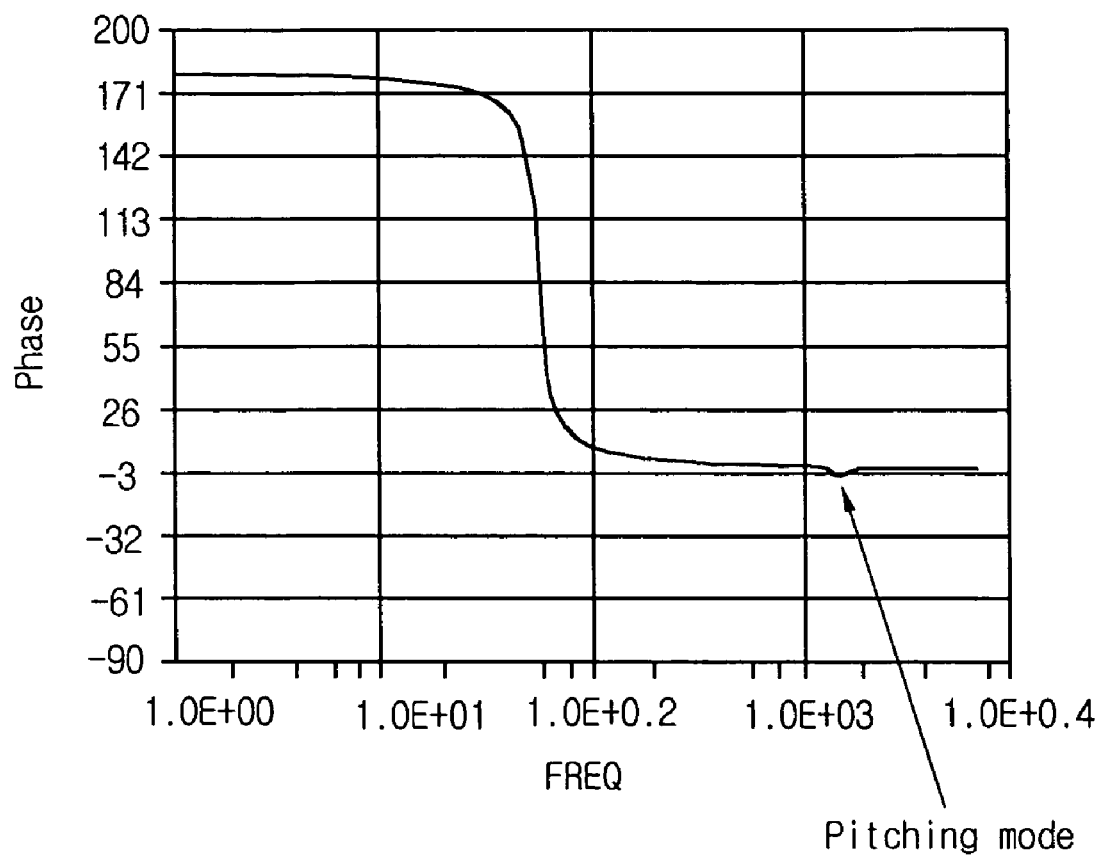
FIGS. 10a and 10b are frequency-to-phase graphs for illustrating a pitching mode, a rolling mode and a yawing mode in a related art optical pick-up actuator.
Figure 10B:
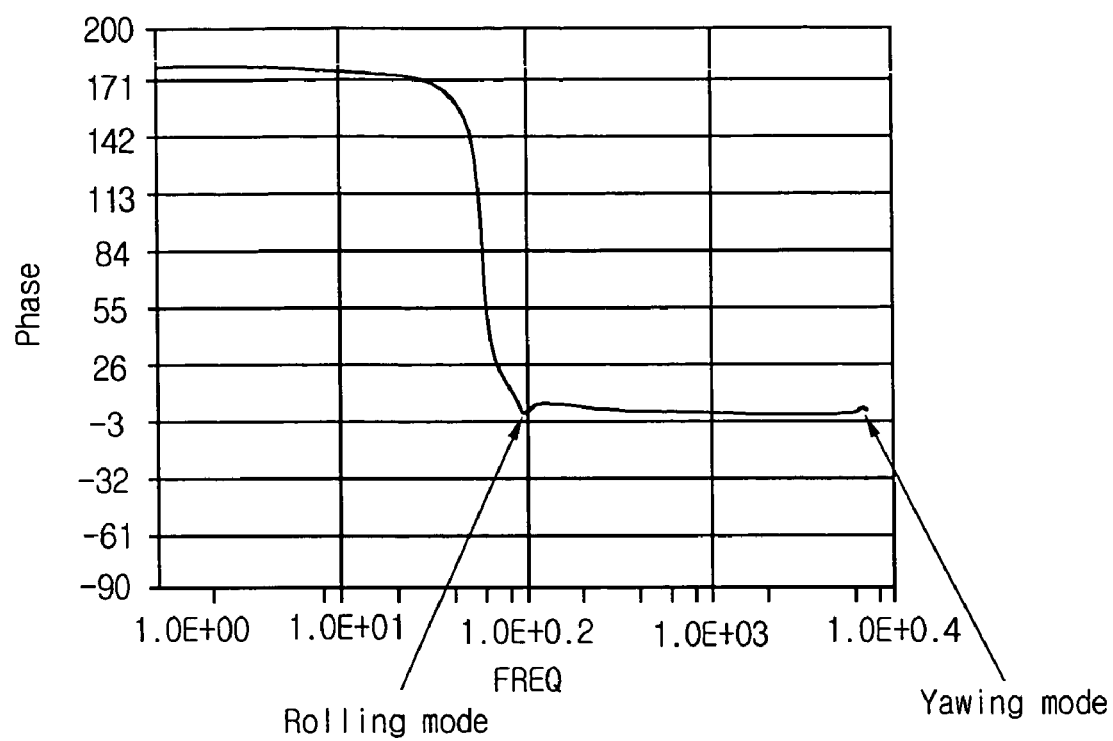
Figure 15A:
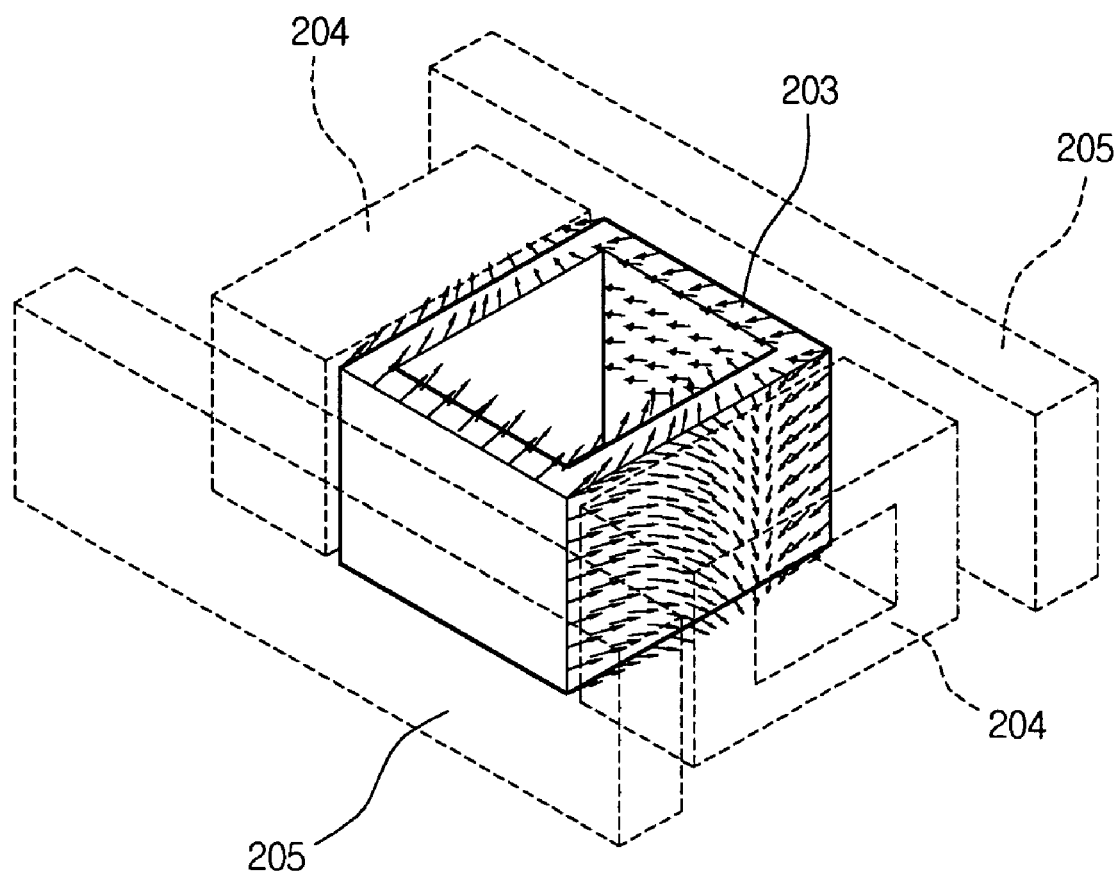
FIGS. 15a and 15b are diagrams illustrating a distribution of magnetic fluxes/vectors of focusing and tracking coils in an optical pick-up actuator according to an embodiment of the present invention.
Figure 15B:
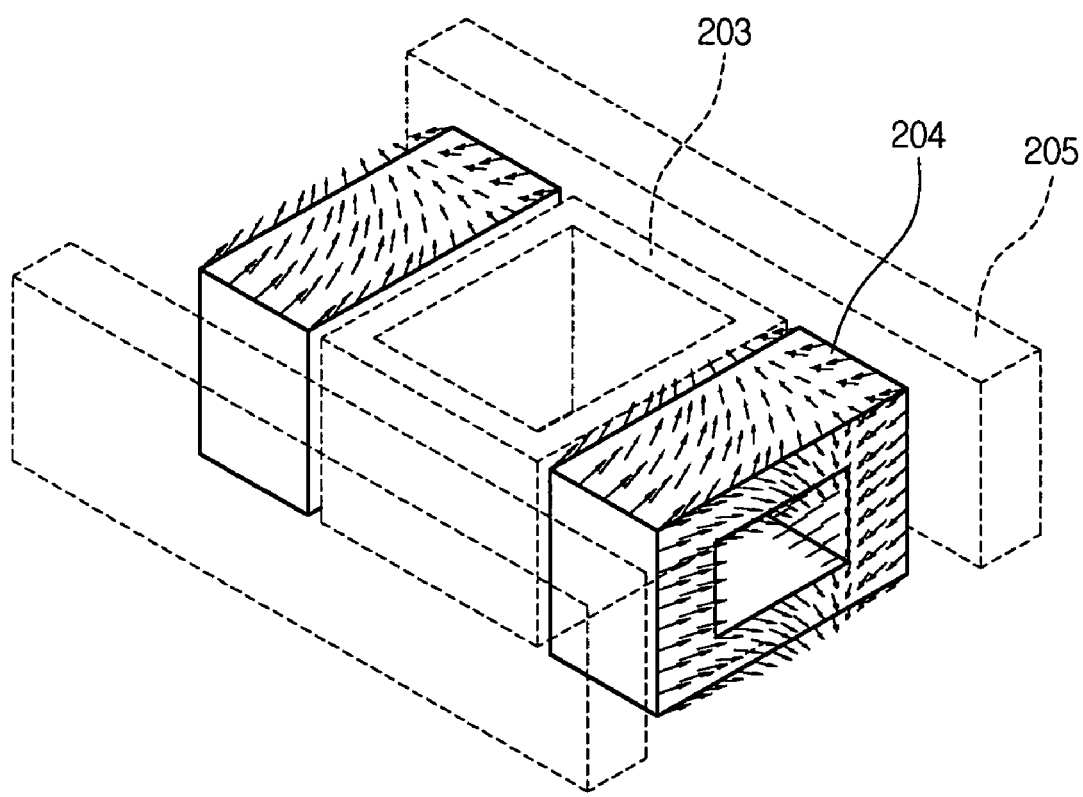

FIGS. 15a and 15b are views illustrating the distribution of the magnetic fluxes/vectors of the focusing and tracking coils in the optical pick-up actuator according to an embodiment of the present invention. FIG. 15a illustrates the flux distribution of the two magnets 205 and the focusing coil 203. As shown in FIG. 15a, if a constant-directional current is applied to the focusing coil 203, the flux distribution operates forwards from a lateral surface facing with the magnets 205 toward the center of the left/right lateral surfaces to perform the focusing operation. This can cause the leakage flux to be reduced or eliminated and a main quantity of the magnetic flux to be greatly taken without substantial loss since the embodiment can use the total of the focusing coil. In contrast, the related art drawback has the leakage flux generated from the focusing coil outside the magnets (see FIG. 1).

FIG. 15b illustrates the flux distribution generated between the two magnets and the tracking coil. As shown in FIG. 15b, if the constant-directional current is applied to the tracking coil 204, the flux distribution operates forwards from the lateral surface facing the magnets 205 toward the center of the up/down lateral surfaces to perform the tracking operation.

In the structure shown in FIG. 11, the frequency characteristic of the lens holder through a simulation shows a bending state at a first frequency (e.g., 21.6 KHz), and shows a twisting state at a second frequency (e.g., 27.8 KHz). The initial transformation is generated at the 21.6 KHz frequency in comparison to the 17.2 KHz frequency at which the initial transformation has been generated in the related art structure. Thus, a margin of about 4.4 KHz can be assured to enlarge the focusing or tracking control area in a high-multiple fast reproduction state such that a high marginal degree of a servo gain can be provided, a higher marginal degree of the frequency can be provided or a servo stability can be improved or assured.

Figure 16A:
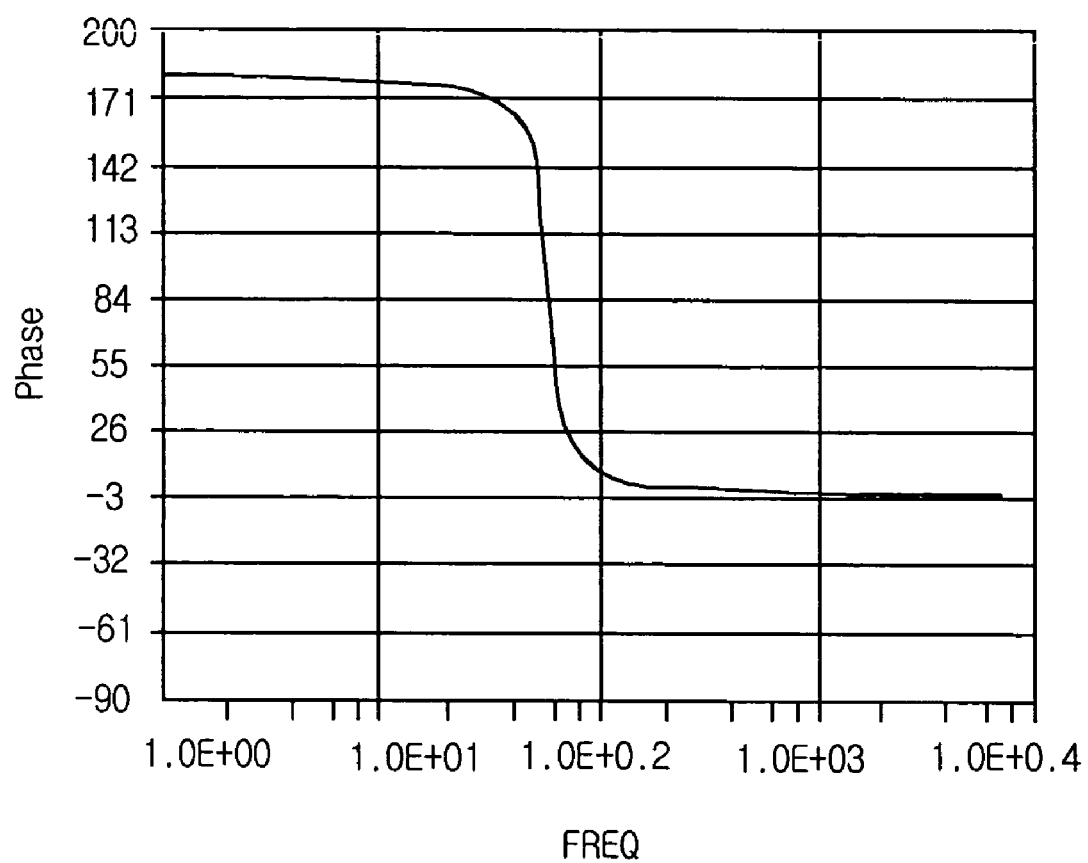
FIGS. 16a and 16b are graphs illustrating a frequency/phase relation of an optical pick-up actuator according to a preferred embodiment of the present invention.
Figure 16B:
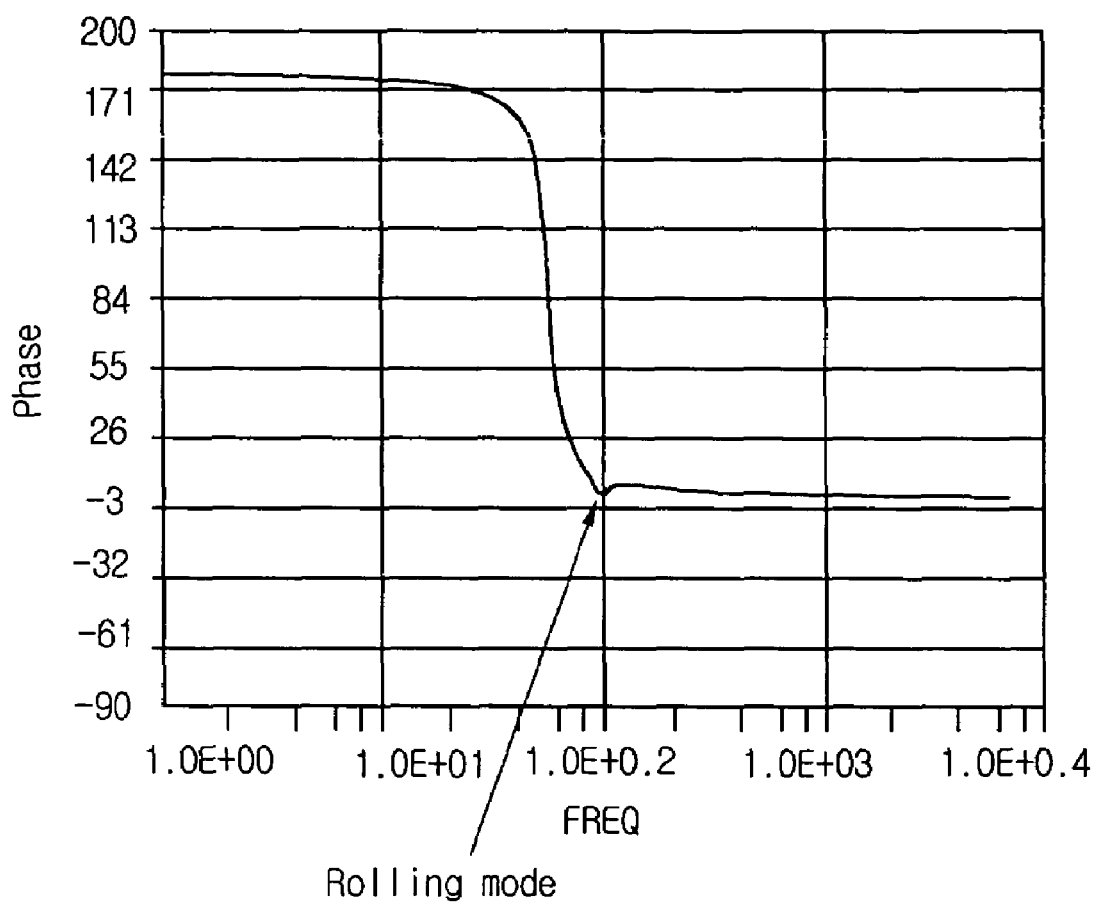
Figure 17:
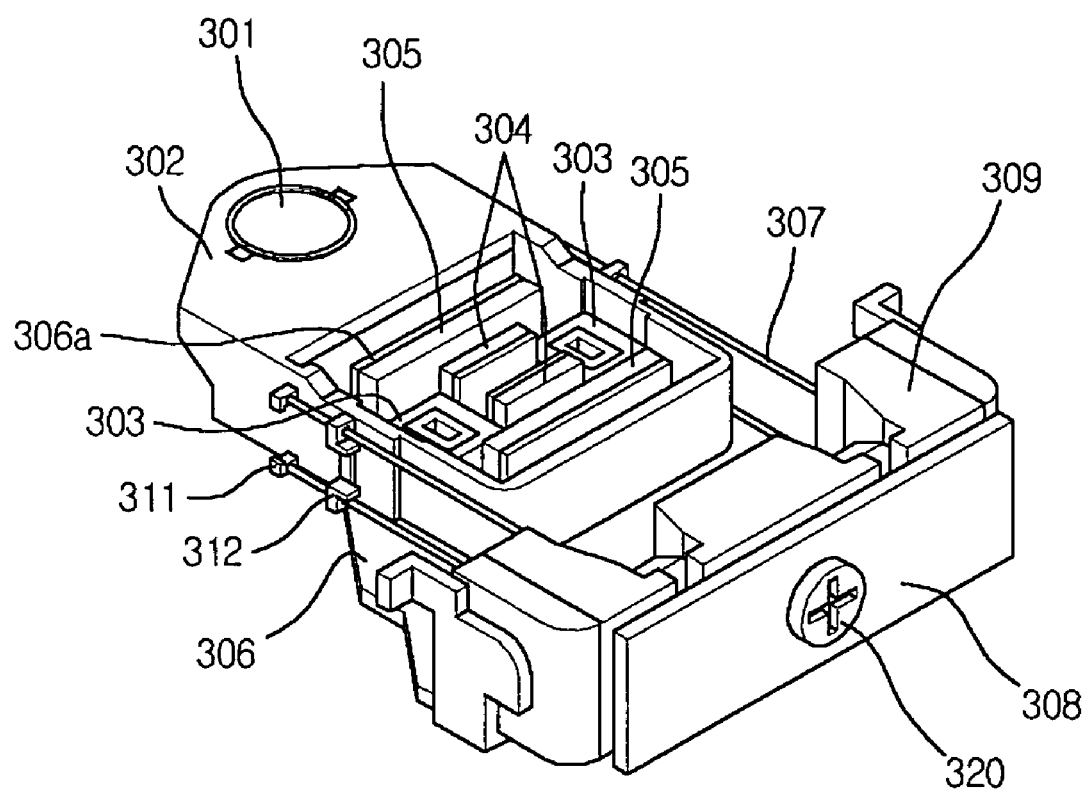
FIG. 17 is a diagram illustrating perspective view of a slim-type optical pick-up actuator according to another embodiment of the present invention.

FIGS. 16a-16b are graphs illustrating a frequency/phase relation measured at a lens part at the time of the focusing vibration-adding and the tracking vibration-adding according to the embodiment of FIG. 11. In this relation graph, since the focusing force center position and the tracking force center position are preferably consistent with each other, the mass center position can be consistent with one position of the focus force center position of the X-axis. Accordingly, the pitching mode and the yawing mode can be reduced to hardly exist and the driving characteristic can be increasingly stable.

FIG. 16a is the phase and frequency relation graph at the time of the focusing vibration-adding in a type of the optical pick-up actuator according to a preferred embodiment of the present invention, and a pitching phase delay has a +0.14° value in the pitching mode. FIG. 16b is a phase and frequency relation graph at the time of the tracking vibration-adding, and a yawing phase delay has a −0.05° value and a rolling phase delay has a +4.10° value. In the related art optical pick-up actuator, the focusing force center position and the tracking force center position are distanced from each other and the mass center position should be positioned (e.g., between) so that the phase delays of the pitching mode and the yawing mode are distributed, and then each of the phases has an opposite direction and about 5.3° value (pitching phase delay=+5.31°, yawing phase delay=−5.38°) and the phase delay in the rolling mode has a +4.62° value.

FIGS. 17 to 19b illustrate an optical pick-up actuator according to another embodiment of the present invention. As shown in FIGS. 17 to 19b, the actuator can include a lens holder 302 having an object lens 301 at one side thereof and preferably integrally has a coil supporter 320 between first and second housing grooves 302a and 302b at the other side thereof. Further, magnets 305 and yokes 306a facing with one another can be installed in the first and second housing grooves 302a and 302b, and a focusing coil 303 and a tracking coil 304 are disposed at the coil supporter 320 between the magnets 305.

The tracking coil 304 on the coil supporter 320 can be installed to face and be, up/down, spaced away from a center of a plurality of magnets, and the focusing coil 305 can be installed to face and be, left/right, spaced away from both sides of the plurality of magnets 305. Preferably, the coil supporter 320 can be integrally formed between the first and second housing grooves 302a and 302b of the lens holder 302, and a tracking coil support boss 322 for supporting a surface (e.g., rear) of the tracking coil can be formed up/down of the central part thereof, and a focusing coil support boss 324 for supporting the focusing coil can be formed left/right of the central part thereof.

Figure 18:
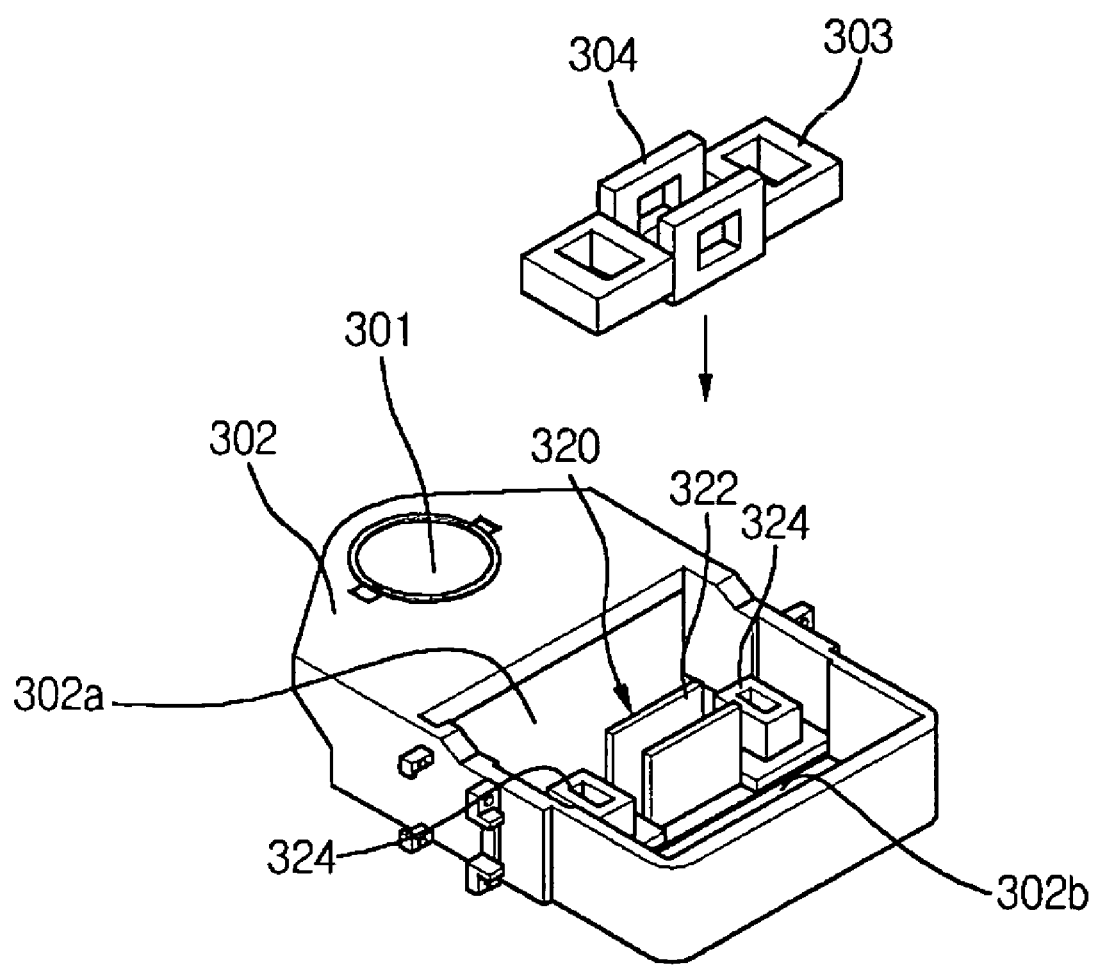
FIG. 18 is a diagram illustrating disassembled perspective view of a lens holder or FIG. 17.

As shown in FIGS. 17 to 19b, the lens holder 302 preferably has the object lens 301 at one side upper portion thereof, and can construct the magnetic circuit at the other side thereof. That is, in the other side first and second housing grooves 302a and 302b of the lens holder are installed the magnets 305 and the yoke 306a. As shown in FIG. 18, on the coil supporter 320 formed between the first and second housing grooves 302a and 302b can be the coils 303 and 304. The yoke 306a can be protruded from the pick-up base 306 or can be also protruded from a yoke plate by a separate connecting unit.

The coil supporter 320 can have the tracking coil support boss 322 formed standing upright front/rear of the central portion thereof, and has the focusing coil support boss 324 formed left/right sides thereof. Preferably, on an external lateral surface of the tracking coil support boss 322 are respectively installed the tracking coils 304 such that they respectively face the central portion of the magnets 305, and on the focusing coil support boss 324 are installed the focusing coils 303 such that they respectively face the lateral surface portions of the magnets 305.

Figure 19A:
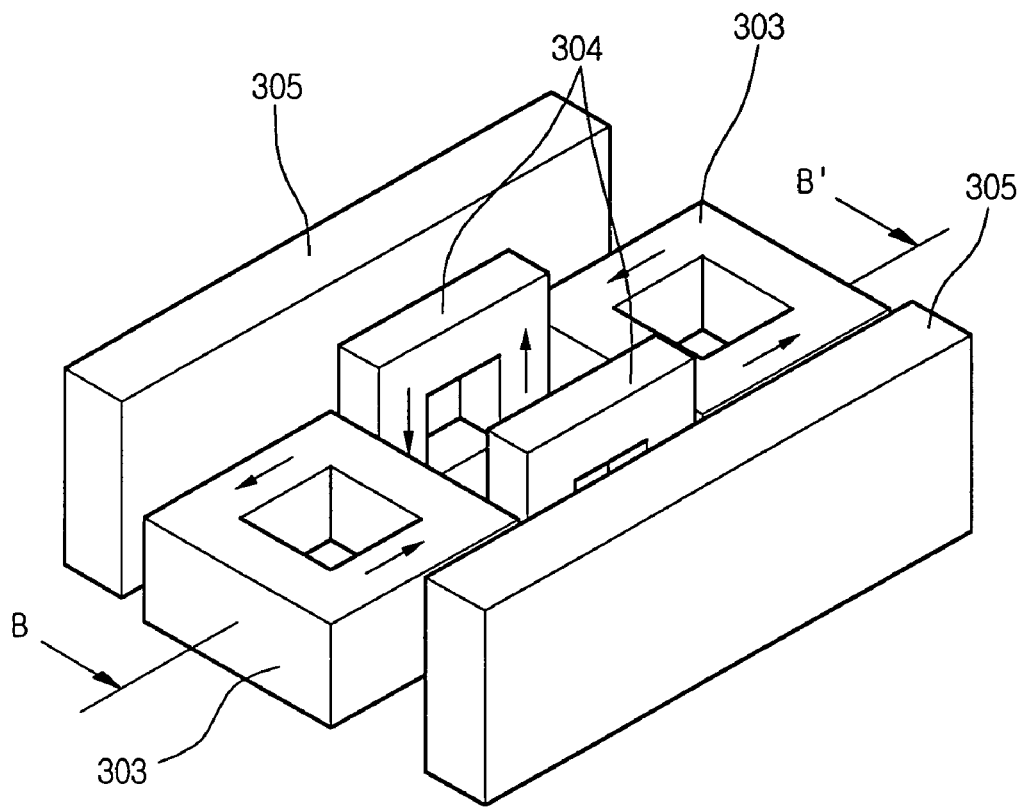
FIGS. 19a and 19b are diagrams illustrating construction of a coil and a magnet of FIG. 17.
Figure 19B:
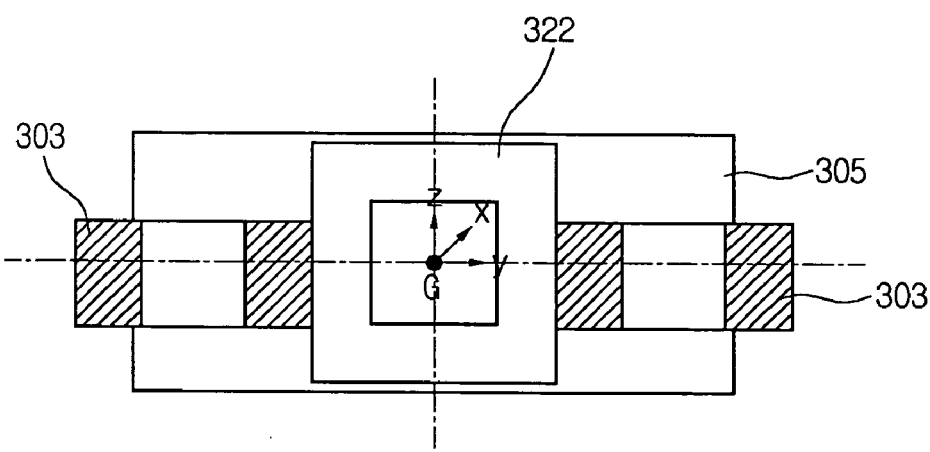

At this time, as shown in FIGS. 19a and 19b, the center of the tracking coil 304 and the center of the focusing coil 303 installed being spaced away from each other can be consistent with each other, and the center of the coils 303 and 304 can be consistent with the mass center position (G) of the lens holder 302. That is, within the activation area range of the lens holder 302 and the magnetic field area of the magnet 305 are preferably installed the coils 303 and 304 such that an activation center of the lens holder 302 and the mass center position of the lens holder can be co-located at one position (G). In the other side central portion of the lens holder 302 can be disposed the coils 303 and 304 in a cross type such that the center position (G) of the cross-typed coils 303 and 304 becomes the mass center position of the lens holder 302 and the force center position depending on the focusing and tracking activation.

As shown in FIGS. 17-19b, the center of the magnetic driving portion (e.g., magnet and coil) can be the mass center position of the lens holder and simultaneously the force center position depending on the tracking and focusing driving, which is preferably positioned within the activation area of the lens holder or the magnetic area range of the magnet. Further, a focusing coil structure and a focusing coil structure can be (e.g., at least one of each) disposed symmetrically at the other side of the lens holder such that they can be also driven more stably even at the time of activation of two axes or three axes.

Preferably, at one position along the X-axis direction of the lens holder is provided the optical pick-up actuator having the mass center position, the focusing operation center position, and the tracking operation center position, which can be coincident so that the leakage flux can be reduced and the main quantity of the magnetic flux can be increased. In addition, a bobbin can be eliminated to reduce a mass thereby realizing a high sensitivity. In addition, between the magnets or within the magnetic field area can be installed the coils such that the interval between the two magnets can be increased relative to the related art thereby reducing a yoke vibration quantity due to the back electromotive force (e.g., Back EMF), which can be generated by a short distance interval between the magnets. That is, an element affected by other magnetic forces can be reduced or eliminated.

As described above, embodiments of an optical pick-up actuator and methods thereof have various advantages. In embodiments of an optical pick-up actuator the focusing coil and the tracking coil can be disposed between the two magnets such that the mass center position of the optical pick-up actuator and the force center position depending on the tracking and focusing driving can be co-located at one position, which can increase a driving reliability and a servo stability. Further, a bobbin is eliminated from the lens holder to reduce the weight of the lens holder, and the coil supporter can be integral with the lens holder and both lateral surfaces of the lens holder can be supported by the coil supporter at a coil-installation position to reduce the transformation of the lens holder. Between the two magnets can be (e.g., including at least one coil structure each) symmetrically concentrated the tracking and the focusing coils such that the distance between the two magnets can be taken wider to reduce the back electromotive force. In addition, the focusing coil and the tracking coil are symmetrically disposed between two magnets to reduce an effect of a phenomenon such as the rolling mode and the pitching mode generated because of differences between the force center position and the mass center position.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A slim-type optical pick-up actuator comprising:
   a lens holder having an object lens for condensing a light on an optical disc, mounted at one side thereof, wherein the lens holder is configured to move in focusing and tracking directions;
   a base having a plurality of first support members, each having a magnet attached thereto, wherein the magnets face each other and each magnet extends in the tracking direction from a first end of the corresponding magnet through a central portion to a second end of the corresponding magnet; and
   a driving member having a focusing coil and first and second tracking coils directly attached to the focusing coil in series in the tracking direction in an order of the first tracking coil, the focusing coil and the second tracking coil, the first tracking coil being a different coil than the second tracking coil, a mass center position of the lens holder being substantially coincident with a force center position of the driving member;

wherein the focusing coil is installed to face the central portion of each of the magnets, the first tracking coil is installed to face the first end of each of the magnets and the second tracking coil is installed to face the second end of each of the magnets;

wherein the lens holder comprises a second support member extending therefrom configured to support the driving member between the magnets, and wherein the driving member activates the lens holder by an electromagnetic force with the magnets in focusing and tracking directions.

2. The slim-type optical pick-up actuator of claim 1, wherein the second support member is integrally formed with the lens holder.

3. The slim-type optical pick-up actuator of claim 1, wherein the second support member has a focusing coil support boss formed at a position facing the central portion of the magnets to dispose a horizontally wound focusing coil, and the lens holder has a coil seat groove formed at both sides of the focusing coil support boss to dispose a vertically wound tracking coil.

4. The slim-type optical pick-up actuator of claim 1, wherein the second support member has a coil support boss facing the central portion of each of the magnets to support a wound focusing coil, and has a coil seat portion formed at sides of the coil support boss to support one of the tracking coils, and wherein each of the magnets has a single polarity.

5. The slim-type optical pick-up actuator of claim 4, wherein the coil support boss supports a horizontally wound focusing coil and the coil seat portion is a groove to support a vertically wound tracking coil.

6. The slim-type optical pick-up actuator of claim 1, wherein the focusing coil and the first and second tracking coils disposed on the second support member are fixed by epoxy.

7. An optical pick-up actuator comprising:
a base that includes a magnetic support unit having a plurality of magnets facing each other;
a lens holder configured to be driven in tracking and focusing directions that includes an object lens mounted at a first side portion thereof and a magnetic driving unit mounted at a second side portion thereof positioned between the magnets,
wherein the lens holder comprises a second support member extending therefrom configured to a support the magnetic driving unit between the magnets, and wherein a mass center position of the lens holder is substantially coincident with a force center position of the magnetic driving unit, wherein coils of the magnetic driving unit comprise:
a focusing coil configured to face a central portion of the plurality of magnets and being horizontally wound in a rectangular shape; and
first and second tracking coils configured to face left and right ends of each of the magnets and each tracking coil being directly attached to a corresponding lateral surface of the focusing coil, the first tracking coil being a different coil than the second tracking coil.

8. An optical pick-up actuator comprising:
a base that includes a magnetic support unit having a plurality of magnets facing each other;
a lens holder configured to be driven in tracking and focusing directions that includes an object lens mounted at a first side portion thereof and a magnetic driving unit mounted at a second side portion thereof positioned between the magnets,
wherein the lens holder comprises a second support member extending therefrom configured to a support the magnetic driving unit between the magnets, and wherein a mass center position of the lens holder is substantially coincident with a force center position of the magnetic driving unit, wherein coils of the magnetic driving unit comprise:
a tracking coil vertically wound to have a rectangular type facing a central portion of each of the magnets; and
first and second focusing coils facing left and right ends of the magnets and each focusing coil being directly attached to the tracking coil, the first focusing coil being a different coil than the second focusing coil.

9. The actuator of claim 7, wherein each magnet of the magnetic support unit has a single polarity.

10. The actuator of claim 7, wherein the force center position of the magnetic driving unit includes a force center position of the focusing coil and a force center position of each of the tracking coils that are each substantially coincident with the mass center position of the lens holder.

11. The actuator of claim 7, further comprising a pair of wire suspensions connected at a first end to the lens holder and at a second end to a frame to support the lens holder with a prescribed degree of freedom.

12. A slim-type optical pick-up actuator, comprising:
single magnets fixed to face one another having a magnetic field area therebetween;
a lens holder having an object lens mounted at one side thereof for activation, and having tracking and focusing coils symmetrically installed directly connected to each other in series in a tracking direction in the magnetic field area of the magnets;
a frame for supporting the lens holder; and
a plurality of wire suspensions for flexibly attaching the frame to the lens holder, wherein the tracking and focusing coils comprise:
a focusing coil positioned at a central portion between the magnets and having a horizontally wound surface facing the magnet; and
left/right-end tracking coils positioned at left/right ends of each of the magnets and each tracking coil having two vertically wound surfaces facing the magnets the left-end tracking coil being different than the right-end tracking coil.

13. The slim-type optical pick-up actuator of claim 12, wherein the lens holder comprises:
first and second housing grooves each having one single magnet positioned therein; and
a coil supporter integrally formed with the lens holder and formed in a Y-axis direction such that the tracking and focusing coils are seated between the first and second housing grooves.

14. The slim-type optical pick-up actuator of claim 12, further comprising a focusing coil support boss having the focusing coil fixed thereto, and having a tracking coil seat groove at a lower level between the focusing coil support boss and an internal lateral surface of the lens holder.

15. A slim-type optical pick-up actuator, comprising:
single magnets fixed to face one another having a magnetic field area therebetween;
a lens holder having an object lens mounted at one side thereof for activation, and having tracking and focusing coils symmetrically installed and directly connected to each other in series in a tracking direction in the magnetic field area of the magnets;

a frame for supporting the lens holder; and a plurality of wire suspensions for flexibly attaching the frame to the lens holder, wherein the tracking and focusing coils comprise:

first and second focusing coils disposed at left and right sides of a coil supporter to face left and right ends of the magnets, and a tracking coil disposed vertically on a center of the coil supporter to face a center of each of the magnets, the first focusing coil being a different coil than the second focusing coil.

16. The slim-type optical pick-up actuator of claim 1, wherein a bobbin for fixing the focusing coil or the first and second tracking coils is not needed.

17. The actuator of claim 7, wherein a bobbin for fixing the focusing coil or the first and second tracking coils is not needed.

18. The slim-type optical pick-up actuator of claim 12, wherein a bobbin for fixing the tracking and focusing coils is not needed.

19. The slim-type optical pick-up actuator of claim 15, wherein the tracking coil and at least one of the focusing coils are disposed between the magnets to reduce a rolling mode or a pitching mode.

20. The slim-type optical pick-up actuator of claim 1, wherein at least one of the tracking coils and the focusing coil are disposed between the magnets to reduce a rolling mode or a pitching mode.

21. The actuator of claim 7, wherein at least one of the tracking coils and the focusing coil are disposed between the magnets to reduce a rolling mode or a pitching mode.

22. The actuator of claim 8, wherein the tracking coil and at least one of the focusing coils are disposed between the magnets to reduce a rolling mode or a pitching mode.

23. The slim-type optical pick-up actuator of claim 12, wherein at least one of the tracking coils and the focusing coil are disposed between the magnets to reduce a rolling mode or a pitching mode.

* * * * *